Jan. 6, 1931.   G. J. RATHBUN   1,788,032
SAFETY OVERSPEED GOVERNOR
Filed Jan. 12, 1928
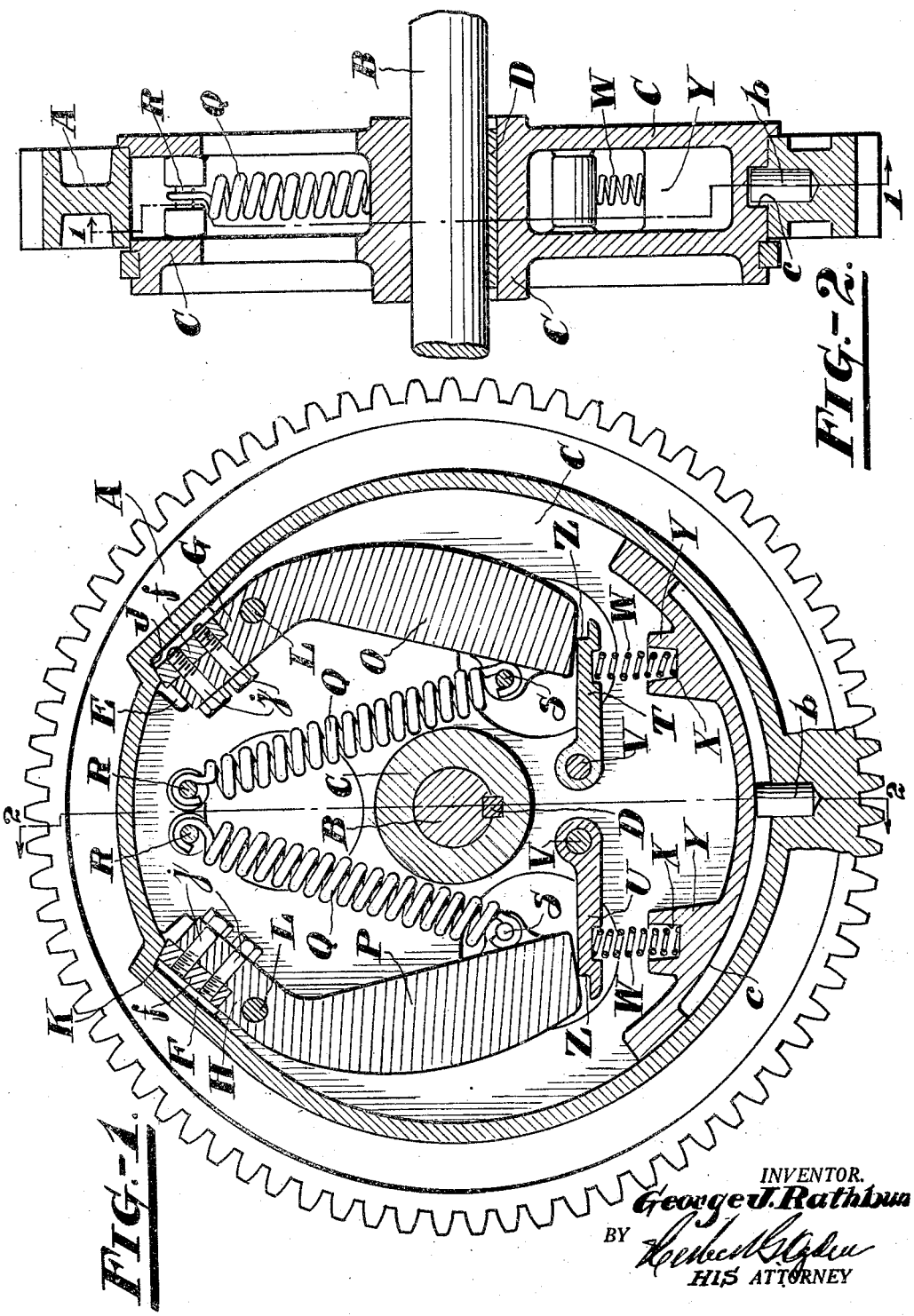
INVENTOR.
George J. Rathbun
BY
HIS ATTORNEY Patented Jan. 6, 1931

1,788,032

UNITED STATES PATENT OFFICE

GEORGE J. RATHBUN, OF EASTON, PENNSYLVANIA, ASSIGNOR TO INGERSOLL-RAND COMPANY, OF JERSEY CITY, NEW JERSEY, A CORPORATION OF NEW JERSEY, AND THE RATHBUN-JONES ENGINEERING COMPANY, OF TOLEDO, OHIO, A CORPORATION OF OHIO

SAFETY OVERSPEED GOVERNOR

Application filed January 12, 1928. Serial No. 246,283.

This invention relates to safety overspeed governors and provides features of general application, but which are of special advantage when applied to engines of the internal combustion type.

The invention has for its object to alter the relation of a driving gear with respect to its driven shaft upon increase of speed beyond a predetermined maximum. The device is preferably arranged to act at a speed in excess of a maximum allowable speed for the engine or other device to which it is connected. Preferably the invention is used as a safety device to operate when all other governing and speed regulating means of types usually provided fail.

It is a further object of the invention to prevent the return of the device to its normal operating relation until the machine or engine has come to a stop. The advantage of such an arrangement is that the engine being brought to a stop must be repaired so as to prevent a recurrence of the conditions which cause the overspeeding.

Further objects and advantages of the invention will be in part obvious and in part pointed out hereinafter.

In the drawing forming part of the specification and in which similar reference characters refer to similar parts, Figure 1 is a vertical section taken along the line 1—1 of Figure 2 looking in the direction of the arrows, the figure showing a gear and its operating shaft connected together in accordance with the practice of the invention and Figure 2 is a cross section of the gear looking in the direction of the shaft and taken along the line 2—2 of Figure 1 looking in the direction of the arrows.

Referring to the drawing, the invention comprises a gear, preferably a cam shaft gear A which is adapted to drive a shaft such as the cam shaft B. The gear A is supported by a hub C fixed to the shaft B as by means of a key D. The periphery of the hub C is for the greater part of its length cylindrical, being provided with apertures E and F through which are adapted to extend a pair of latch members G and H forming means to engage the gear A at suitable notches J and K on the inner surface of the gear A. The latches G and H are mounted on the hub C by means of pivots L and are provided with weighted tail portions O and P which are adapted to move radially outward with respect to the shaft B. Normally the latches G and H are held in engagement with the notches J and K respectively by means of suitable coil springs Q fixed at one end through pins R on the hub C and at their free ends attached to pins S of the tail portions O and P. The latches G and H are adapted to be latched in their disengaged position if swung outwardly by a second pair of latches T and U pivotally mounted on the hub C by means of pins V and spring pressed against the tail portions O and P of the latches G and H by means of coil springs W mounted in recesses X of bosses Y integrally formed with the hub C. Near their ends the latches T and U are provided with notches Z to grip the inner edges of the weighted tail portions O and P of the latches G and H respectively.

Movement of the gear A with respect to the hub C is limited by means including a pin $b$ mounted on the inner surface of the gear A and adapted to slide in a slot $c$ extending for a portion of the periphery of the hub C. When disengaged by the latches G and H the gear A is free to rotate with respect to the hub C within limits determined by the sliding of the pin $b$ in the slot $c$.

In normal operation of the device the cam shaft gear A is adapted to drive the shaft B in a fixed driving relationship, the latches G and H being in engagement with the notches J and K respectively of the gear. If the speed of the cam shaft B and the gear A is excessive the centrifugal force acting on the tail portions O and P overcomes the tension of the springs Q removing the latches G and H from the notches J and K respectively to alter the driving relationship of the gear A and shaft B, preferably the shaft B is a cam shaft and is adapted to operate the valve mechanism (not shown) of an engine (not shown). The driving connection for such valves being changed the engine cannot continue to supply power and the speed is consequently reduced. It is thought more desirable to continue the rotation of the cam shaft B at a changed driving relationship of the gear A and accordingly the pin $b$ is adapted to engage the hub C at one end of the slot $c$ so as to continue rotation of the shaft B. This changed relation is adapted to retard the valve events about 110° so that there is substantially no compression in the cylinders, not enough to fire the oil vapor. The latches T and U hold the latches G and H in their disengaging position due to the pressure of the springs W so that the latter latches cannot become re-engaged with the gear A except by the intention of the operator.

As has been said above, the device is not intended to operate unless all other governing or speed regulating means has failed. Consequently it is desirable that this device should be restored to its normal running position only when the trouble which caused the overspeeding has been cured. As a general rule, the cam shaft gear and cam shaft are enclosed in a suitable casing (not shown) and the holding of the latches G and H in disengaged position by means of the holding latches T and U insures that the engine must be taken apart somewhat before it is restarted.

The device in this instance is designed for use on an engine which is reversible and accordingly the latches G and H are oppositely faced to engage the oppositely faced notches J and K respectively. Consequently the device is operable regardless of the direction of rotation of the cam gear A and shaft B. If desired the latches G and H may be provided with renewable wearing blocks $f$ bolted in place by the screws $j$.

Thus by the above construction are accomplished, among others, the objects hereinbefore referred to.

I claim:

1. A safety overspeed governor for internal combustion engines and the like, comprising a gear, a shaft, a hub supported by said shaft and fixed thereto adapted to support said gear, a latch on said hub to lock said gear to the hub at normal speeds of the shaft and speed responsive means to disengage said latch at excessive speeds of the shaft.

2. A safety overspeed governor for internal combustion engines and the like, comprising a gear, a shaft adapted to be driven by said gear, a hub supporting said gear and fixed to said shaft, a pair of latches on said hub to lock the gear fixedly to the hub at normal speeds of the shaft and speed responsive means to disengage said latches at excessive speeds of the shaft.

3. A safety overspeed governor for internal combustion engines and the like, comprising a gear, a shaft adapted to be driven by said gear, a hub supporting said gear and fixed to said shaft, latch means on said hub to normally lock said gear to the hub, speed responsive means to disengage said latches at excessive speeds of the shaft, and means to limit the rotation of said gear with respect to said hub upon release of the latches from the gear.

4. A safety overspeed governor for internal combustion engines and the like, comprising a gear, a shaft, a hub supporting said gear and fixed to said shaft, latch means pivotally mounted on said hub and in engagement with said gear for normally locking the gear to the hub, said latch means being centrifugally operated to disengage said gear, and means carried by the gear and engaging the hub to limit rotation of said gear on said hub.

5. A safety overspeed governor for internal combustion engines and the like, comprising a gear, a shaft, a hub supporting said gear and fixed to said shaft, latch means on said hub and in engagement with said gear for normally locking the gear fixedly to the hub, said latch being centrifugally operated to disengage said gear, and means carried by the hub to hold said latch means in disengaged position.

6. A safety overspeed governor for internal combustion engines and the like, comprising a gear, a shaft adapted to be driven by said gear, a hub supporting said gear and fixed to said shaft, latch means on said hub to engage said gear and centrifugally operated to disengage said gear, means to hold said latch means in disengaged position and means to limit rotation of said gear with respect to said hub.

7. A safety overspeed governor for internal combustion engines and the like, comprising a gear, a shaft adapted to be driven by said gear, a hub supporting said gear and fixed to said shaft, a pair of latches, spring pressed to engage said gear and mounted on said hub, said latches being centrifugally operable to disengage said gear, a second pair of latches engaging the first said latches in disengaged position and a pin on said gear adapted to engage said hub to limit rotation of said gear with respect to said hub.

8. A safety overspeed governor for internal combustion engines and the like comprising a gear, a shaft adapted to be driven by said gear, a hub supported by said shaft, engaging means mounted on said hub for normally locking said gear and said shaft in fixed relationship, and means to disconnect said engaging means from the gear.

9. A safety overspeed governor for internal combustion engines and the like comprising a gear, a shaft adapted to be driven by said gear, a hub supported by said shaft, speed responsive engaging means mounted on said hub for normally locking said gear and said shaft fixedly together, and means to disconnect said engaging means from the gear.

10. A safety overspeed governor for internal combustion engines and the like comprising a gear, a shaft, means for normally locking the gear and the shaft together, speed responsive means adapted to actuate said means to a position allowing relative movement between the gear and the shaft, and means for positively locking the first said means in such position to prevent unintentional re-engagement of the gear and the shaft by the first said means.

11. A safety overspeed governor for internal combustion engines and the like comprising a gear, a shaft normally having a predetermined fixed driving relation to said gear, means adapted to engage the gear and the shaft for maintaining said gear and said shaft in the predetermined driving relation, means to actuate said engaging means to a position allowing relative movement between the gear and the shaft to thereby permit of alteration in the driving relation between said gear and said shaft, and means to positively lock the engaging means in such position to prevent unintentional re-establishment of the normal driving relationship between the gear and the shaft.

In testimony whereof I have signed this specification.

GEORGE J. RATHBUN.